US012770512B2

(12) United States Patent
Giles

(10) Patent No.: US 12,770,512 B2
(45) Date of Patent: Oct. 20, 2026

(54) SYSTEM AND METHOD FOR VISUAL REPRESENTATION AND MANAGEMENT OF TRAFFIC CAPACITY AT ROADWAY INTERSECTIONS

(71) Applicant: Wavetronix LLC, Springville, UT (US)

(72) Inventor: Brad Giles, Springville, UT (US)

(73) Assignee: WAVETRONIX LLC, Springville, UT (US)

( * ) Notice: Subject to any disclaimer, the term of this patent is extended or adjusted under 35 U.S.C. 154(b) by 0 days.

(21) Appl. No.: 18/615,560

(22) Filed: Mar. 25, 2024

(65) Prior Publication Data

US 2025/0299578 A1 Sep. 25, 2025

(51) Int. Cl.
*G08G 1/0968* (2006.01)
*G08G 1/01* (2006.01)
*G08G 1/0967* (2006.01)

(52) U.S. Cl.
CPC ..... *G08G 1/096855* (2013.01); *G08G 1/0116* (2013.01); *G08G 1/0129* (2013.01); *G08G 1/0145* (2013.01); *G08G 1/096766* (2013.01)

(58) Field of Classification Search
CPC ....................... G08G 1/096855; G08G 1/0116
See application file for complete search history.

(56) References Cited

U.S. PATENT DOCUMENTS 6,556,916 B2 4/2003 Waite et al.
6,693,557 B2 2/2004 Arnold et al.
7,426,450 B2 9/2008 Arnold et al.
7,427,930 B2 9/2008 Arnold et al.
7,573,400 B2 8/2009 Arnold et al.
7,889,097 B1 2/2011 Arnold et al.
7,889,098 B1 2/2011 Arnold et al.
7,924,170 B1 4/2011 Arnold et al.
7,991,542 B2 8/2011 Giles et al.
8,248,272 B2 8/2012 Arnold et al.
8,665,113 B2 3/2014 Arnold et al.
9,111,448 B2 * 8/2015 Yester ....................... G08G 1/07
9,240,125 B2 1/2016 Arnold et al.
9,412,271 B2 * 8/2016 Sharma ..................... G08G 1/07
9,779,621 B1 * 10/2017 Urmson ................. G08G 1/048

(Continued)

OTHER PUBLICATIONS

Denny Jr., "Long Green Times and Cycles at Congested Traffic Signals", 2009, pp. 1-10.

(Continued)

*Primary Examiner* — Jess Whittington
(74) *Attorney, Agent, or Firm* — Workman Nydegger

(57) ABSTRACT

A system for displaying a supply of traffic capacity and optionally a level of traffic demand at a roadway intersection may receive a time-duration dataset comprising a duration of active time allocated to each of one or more traffic phases assigned to movements at the roadway intersection. Additionally, the system may receive a traffic-demand dataset comprising turn move counts for each movement and optionally overflow counts for each lane at the roadway intersection. Based upon the time-duration dataset, the system may calculate one or more dequeue zone sizes. Based upon the traffic-demand dataset, the system may also calculate one or more queue sizes. Additionally, the system may display, at a computer interface, a visual representation of the one or more dequeue zone sizes for one or more approaches.

28 Claims, 6 Drawing Sheets

(56) References Cited

U.S. PATENT DOCUMENTS

| | | | | |
|---|---|---|---|---|
| 11,270,581 | B1 * | 3/2022 | Palumbo | G08G 1/052 |
| 11,398,150 | B2 * | 7/2022 | Young | G08G 1/0141 |
| 12,367,771 | B2 * | 7/2025 | Quirynen | G08G 1/0112 |
| 2002/0116118 | A1 * | 8/2002 | Stallard | G08G 1/082<br>701/119 |
| 2008/0094250 | A1 * | 4/2008 | Myr | G08G 1/081<br>340/909 |
| 2009/0170533 | A1 * | 7/2009 | Filizola | G08G 1/0104<br>701/116 |
| 2018/0151064 | A1 * | 5/2018 | Xu | G08G 1/0125 |
| 2020/0103236 | A1 * | 4/2020 | Adams | G01C 21/3811 |
| 2020/0160701 | A1 * | 5/2020 | Mobasser | G08G 1/0145 |
| 2020/0200563 | A1 * | 6/2020 | Martin | G08G 1/0112 |
| 2022/0076038 | A1 * | 3/2022 | Chen | G06V 10/22 |
| 2022/0101720 | A1 * | 3/2022 | Huang | G08G 1/0112 |
| 2022/0108611 | A1 * | 4/2022 | Ho | G08G 1/096775 |
| 2023/0020155 | A1 * | 1/2023 | Liu | G06V 10/811 |
| 2024/0021076 | A1 * | 1/2024 | Menard | G08G 1/096733 |
| 2024/0331535 | A1 * | 10/2024 | Quirynen | G08G 1/0112 |
| 2025/0189331 | A1 * | 6/2025 | Ho | G01C 21/3492 |

OTHER PUBLICATIONS

Freije R et al., “Graphical Performance Measures for Practitioners to Triage Split Failure Trouble Calls”, 2014, pp. 1-23.

Henry R.D., “Signal Timing on a Shoestring”, Publication No. FHWA-HOP-07-006, Mar. 2005, p. 54.

Lee et al., “Entering Headway at Signalized Intersections in a Small Metropolitan Area”, Transportation Research Record 1091, 1986, pp. 117-126.

Liu et al., “Real-time queue length estimation for congested signalized intersections”, Transportation Research Part C, vol. 17, Feb. 24, 2009, pp. 412-427.

* cited by examiner

SYSTEM AND METHOD FOR VISUAL REPRESENTATION AND MANAGEMENT OF TRAFFIC CAPACITY AT ROADWAY INTERSECTIONS

BACKGROUND

Modern traffic control systems are designed to manage the flow of vehicles through intersections in an efficient and safe manner. These systems often rely on signalized intersections, where traffic signals regulate the movement of vehicles. The signals typically operate in cycles, with each cycle consisting of a series of timing phases. Each phase corresponds to a specific movement or set of movements (e.g., straight ahead, left turn, right turn) that are permitted to proceed through the intersection.

The allocation of time to each phase, known as the green time, is a central aspect of traffic control. The green time determines the maximum number of vehicles that can clear the intersection during a given phase. This is often referred to as the traffic capacity of the intersection. The traffic capacity can vary based on a number of factors, including the approach grade, geometric conditions, environmental conditions, weather conditions, construction work zones, vehicle population, and motorist population.

Traditionally, traffic engineers have used tables of numerical time values or bar charts, such as ring-and-barrier diagrams, to represent the allocation of traffic supply. These diagrams show the phase numbers assigned to each traffic movement and the relative duration of time for each phase. However, these traditional representations may not provide a clear visual understanding of the intersection's operation, especially for non-experts.

Another aspect of traffic control is the detection of traffic demand. This is typically achieved through the use of detection zones, which are areas on the roadway where vehicles are sensed by devices such as radars, traffic cameras, or inductive loops. When traffic demand is detected, the detection data can be sent to the traffic controller to request service for waiting or arriving vehicles.

Despite these existing methods and tools, managing traffic flow at intersections remains a complex task that requires a deep understanding of traffic engineering principles and practices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for displaying a supply of traffic capacity at a roadway intersection. For example, a system may calculate one or more dequeue zone sizes based on phase time duration data for the roadway intersection. The system may also display, at a computer interface, a visual representation of the one or more dequeue zone sizes for one or more approaches of the roadway intersection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

Figure 1:
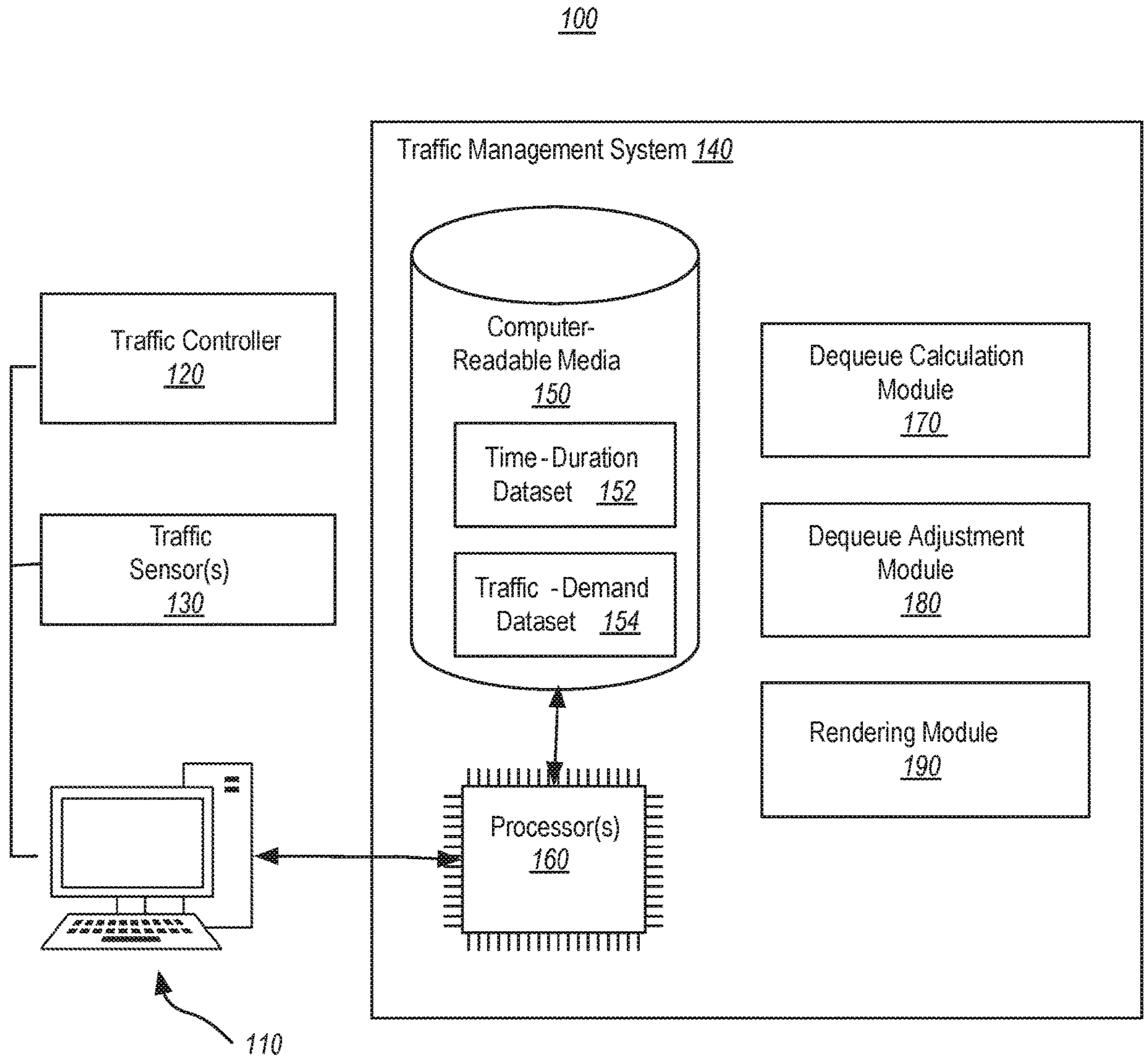
FIG. 1 illustrates a schematic diagram of a traffic management system.

Disclosed embodiments include a computer system and method for visually representing and managing traffic capacity and/or demand at roadway intersections. The system can receive a time-duration dataset and a traffic-demand dataset, calculate dequeue zone sizes and queue sizes based on these datasets, and display a visual representation of the intersection. As used herein, "length" and "size" may be used interchangeably unless stated otherwise. A typical intersection involves a junction of multiple roads or streets as well as pedestrian and bicycle pathways, with each such incoming or outgoing road, street, pedestrian pathway, or bicycle pathway referred to as a "leg" of the intersection. The visual representation of the intersection may include overlaid dequeue zones and queue lengths on one or more of these intersection legs. The system may also allow users to manually adjust the length of a particular dequeue zone based on their understanding of the intersection's traffic dynamics. Accordingly, the system may provide a clear and intuitive view of the intersection's traffic dynamics, making it easier for traffic engineers and the general public to monitor the operation of an intersection.

For example, the visual representation of traffic supply (dequeue zones) may be shown to motorists stopped waiting at an intersection via telematics or handheld devices inside their vehicle. This information could help the waiting drivers prepare to dequeue when the light turns green and help them provide informed feedback to traffic engineers responsible for managing those lights. For example, in some cases drivers might volunteer to provide feedback to intersection managers as a civic service, or in other cases the drivers may be compensated for providing feedback via a reward program. In these cases, drivers may be only shown a single dequeue zone pertaining to their lane of travel, or they may be shown a view of the entire intersection. One exemplary form of feedback would be the user reporting that they were unable to dequeue during the subsequent green signal for their movement (and therefore had to stop again) despite the system predicting that they would be able to dequeue.

As used herein, dequeue zones comprise a predicted length of roadway or a predicted number of vehicles that can dequeue during a single active signal phase. An active signal phase can include green and yellow signals. As such, dequeue zones can be visually displayed as spatial representations of areas related to the supply of traffic capacity. As such, dequeue zones may allow traffic engineers to understand how the intersection controller's allocation of traffic capacity to each movement addresses the prevailing demand without having to compare timing values with the number of vehicles in the lanes of the movement. Additionally, using dequeue zones, a newly proposed allocation of traffic capacity can be visually compared to the current plan's allocation. This can be done with or without a table or diagram that shows the timing values of the intersection.

Disclosed embodiments may also allow for the transformation of conventional time values to spatial distances that can be calibrated for each intersection and each movement, providing a tailored solution for each specific traffic scenario. Dequeue zone lengths can also be compared to turn-bay storage lengths and other physical considerations that impact the capacity of the intersection. Additionally, dequeue zones can be overlaid with detection zones, maps, and sensor footprints, providing a comprehensive view of the intersection's operation.

Another advantage is that dequeue zone lengths can be visually compared to real-time demand using sensors that can report extended queues in the system user interface. Also, when the signal light turns from red to green, the dequeue zone sizes can be adjusted in real time to dynamically indicate the current length or area that can be expected to dequeue with the limited remaining green time. In this way, as the live queue sizes dynamically reduce the corresponding dequeue zone size live residual can also be shown. Then once the green time for a timing phase ends, the real time dequeue zones would then return to their expected values for the next activation of the green. Dequeue zones can also show additional reserve capacity assigned to handle random bursts of traffic on specific movements. This visual approach simplifies the task of traffic engineers in monitoring the operation of an intersection. They can see if the decisions of the system match their intuition, and in some cases, they may learn new ideas by watching how an adaptive algorithm finds new ways to increase the realized capacity of the intersection. Moreover, the roadway representation can be aligned so that supply and demand from different directions can be compared side-by-side. When a coordinated system transitions from one plan to the next using a method such as dwell or shortest-way, the additional capacity to phases used in transition can be shown with dequeue zones. In at least one embodiment, dequeue zones can also be shown in traffic simulators that model real-time demand for purposes of training traffic personnel offline to help them more readily understand the nuances of changes in capacity in a dynamic actuated system undergoing transition or adaptation.

Referring now to FIG. 1, a schematic diagram of a computer system 100 for displaying a supply of traffic capacity and a level of traffic demand at a roadway intersection is depicted. The computer system 100 includes at least one computing device 110. The computing device may be connected to a traffic controller 120 and/or traffic sensor(s) 130. The computing device 110 executes a traffic management system 140, which is responsible for displaying the dequeue zones for the traffic at the intersection.

The traffic sensor(s) 130 may include a variety of different sensor types. For example, one of the oldest and widely used traffic sensors are inductive loop detectors. These consist of a wire loop embedded in the road surface, creating an electromagnetic field that gets disrupted when a vehicle passes over it, signaling the sensor. They are often used at intersections to control traffic signals. Another type of traffic sensor is the radar sensor, which uses radio waves to detect vehicle characteristics such as presence, speed, and/or travel direction. Typically mounted on poles or overhead structures, they are often used on highways and major roads for traffic monitoring and speed enforcement. Video detection systems, on the other hand, use cameras to capture images or video footage of the roadway, with advanced image processing algorithms detecting and tracking vehicles. These systems are often used in traffic management centers for real-time traffic monitoring and incident detection. Infrared sensors, which use infrared light to detect vehicle presence and movement, are typically used in combination with other types of sensors to improve detection accuracy and reliability. Acoustic sensors use sound waves for detection and are typically used in specific applications, such as detecting large vehicles or vehicles traveling at high speeds. Lidar sensors use laser pulses to detect vehicle characteristics such as presence, speed, and/or travel direction. Other sensors, in addition to those described above, may also be used in conjunction with the disclosed system.

The traffic management system 140 is executed by one or more processors 160 using instructions stored on a computer-readable media 150. The computer-readable media 150 may comprise a single storage device or multiple storage devices. For example, the computer-readable media 150 may comprise a local storage device at the computing device 110 and/or an external storage device, such as a server or a cabinet interface device. The computer-readable media 150 may also store a time-duration dataset 152 and a traffic-demand dataset 154. The time-duration dataset 152 and the traffic-demand dataset 154 can both be used to calculate various aspects of the disclosed invention. As used herein, the "time-duration dataset 152" comprises a duration of active time allocated to each of one or more traffic phases assigned to movements at the roadway intersection. The active time allocation may be read from a set of planned time values stored on a computing device 110 or be determined by observing the actual amount of time recently allotted by a traffic controller 120. In at least one embodiment, active time allocation may be received in a communication message encoded with the actual amount of time recently allotted (i.e., synchronous data link control data or high-definition data). Movements comprise left turns, right turns, U-turns, and/or straight movements through an intersection. This dataset is typically received from a traffic controller or other traffic management system and provides the system with the information it requires to calculate dequeue zone sizes. The traffic-demand dataset 154, on the other hand, comprises the level of inbound traffic for movement at the roadway intersection. This traffic-demand dataset 154 typically is received from traffic sensors located at the intersection, such as radar sensors, traffic cameras, or inductive loops. The traffic-demand dataset provides the system with the information it requires to calculate queue sizes. The level of inbound traffic may comprise turn move counts that include a count of the left turns, right turns, U-turns, and/or straight movements within an intersection. In some embodiments, the level of inbound traffic is provided on a per-lane basis. The level of inbound traffic may also comprise overflow queue counts that may be added to turn move counts. Overflow queue counts are counts of vehicles in lanes upstream of the stop bar after the light transitions from green to red. Overflow queue counts may be detected by sensors with a field of view that can detect one or more queue positions near the stop bar. If the field of view only includes one queue position, the occupancy of the zone at that position can be monitored during the green, yellow, and red time. If the zone occupancy ratio is high during green, yellow, and the first several seconds of red, then an overflow queue count of one or more may be detected.

The traffic management system 140 may also include a dequeue calculation module 170, a dequeue adjustment module 180, and a rendering module 190. The dequeue calculation module 170 is configured to calculate one or more dequeue zone sizes based upon the time-duration dataset 152. The dequeue calculation module 170 is also configured to calculate one or more queue sizes based upon the traffic-demand dataset 154. In at least one embodiment, the dequeue adjustment module 180 is configured to receive, through a computer interface, an input configured to adjust a particular dequeue zone size selected from the one or more dequeue zone sizes. The dequeue adjustment module 180 is also configured to calculate an adjusted duration of active time allocated to the particular dequeue zone size with the adjusted size. This adjusted duration of active time may then be communicated to the traffic controller 120, which is configured to control the roadway intersection.

The rendering module 190 is configured to display, at a computer interface, a visual representation of the one or more dequeue zone sizes for one or more approaches of the roadway intersection. The visual representation may also depict a rendering of the one or more queue lengths for one or more approaches of the roadway intersection.

In some cases, the computer system 100 may be implemented using a variety of hardware and software configurations. For example, the computing device 110 may be a personal computer, a server, a mobile device, a cabinet interface device, or any other type of computing device. The traffic controller 120 may be a standalone device or may be integrated with the computing device 110. The traffic sensor(s) 130 may include a variety of sensors, such as radar sensors, traffic cameras, inductive loops, or other types of sensors capable of detecting traffic demand. The traffic management system 140, the dequeue calculation module 170, the dequeue adjustment module 180, and the rendering module 190 may be implemented as separate software modules or may be integrated into a single software application.

Based on the time-duration dataset 152, the dequeue calculation module 170 calculates one or more dequeue zone sizes. The dequeue zone size may be calculated by dividing the active duration of time allocated to one or more traffic phases by an average time it takes for a vehicle to enter the intersection. For instance, for a particular intersection it may take two seconds for a vehicle to enter the intersection. The dequeue calculation module 170 can calculate the dequeue zone size by dividing the active time duration by two seconds to determine how many vehicles can enter and exit the intersection during the active time. The dequeue calculation module 170 can also calculate a roadway length that is associated with the dequeue zone size by multiplying the number of vehicles by an average vehicle size and spacing for a particular intersection 200. In at least one embodiment, a dequeue zone size for a permissive lane or permissive turn move may be calculated based upon the number of acceptable gaps estimated to be in one or more conflicting traffic streams during the active period of a shared timing phase. As used herein, a "permissive lane" comprises a lane that allows vehicles to make turn moves through the intersection despite one or more opposing traffic streams also being active at the same time. Vehicles in permissive lanes rely on gaps in oncoming vehicle and conflicting pedestrian traffic to complete turning maneuvers. The oncoming vehicles and conflicting pedestrians often have the right-of-way over the permissive turn move. As such, if a conflicting traffic stream to the permissive lane has no acceptable gaps, then the dequeue zone may be drawn at the length of the one or two vehicles that are able to pass through the light on yellow. In contrast to permissive lanes, a protected lane or protected turn move has no conflicting vehicles or pedestrians and therefore its dequeue zone size may be determined by the active time without the need to estimate the number of acceptable gaps in conflicting traffic streams.

In additional or alternative embodiments, a variety of different equations can be used to calculate a dequeue zone size. For example, one equation involves measuring the overall active duration of time used by all the vehicles that enter the intersection for a specific movement of an intersection. This overall time is then used to calculate the average time it takes for a vehicle to enter the intersection. This would be a site-specific capacity model for the intersection. Additionally, another equation involves using a data set that contains the amount of time required for each sequential vehicle in each queue to enter the intersection (cross the stop bar). These queue-position based entry times can be used to compute an empirical capacity model of dequeuing for the intersection. In this case, instead of using a single average time it takes for each vehicle to enter the intersection, there may be different average times for each queue position in each queue. The computer system 100 can use this information to determine how much traffic capacity is available for each traffic phase.

In at least one embodiment, one or more dequeue zone sizes are calculated based upon a capacity model. A capacity model in transportation engineering serves as a useful tool for estimating the maximum number of vehicles a roadway, intersection, or transportation system can effectively accommodate while maintaining acceptable levels of service and safety. These models utilize principles of traffic flow theory, which take into account a range of factors to determine a road's capacity. Roadway characteristics such as lane count, width, and geometry are assessed, as these elements significantly influence traffic capacity. Additionally, the mix of vehicles, including passenger cars, trucks, and buses, plays a vital role, as heavier vehicles require more space and affect traffic flow differently. Additionally, the presence of pedestrians can also impact capacity due to crosswalk passage conflicts, or due to extension of green times to accommodate pedestrian clearance.

Lane configurations, including the presence of multiple lanes, turn lanes, and carpool lanes, are taken into consideration. Intersection capacity models also factor in traffic signal timings, cycle lengths, green times, phase sequences, and concurrent phasing constraints such as split phasing to evaluate an intersection's capacity. Driver behavior, encompassing elements like desired speeds, reaction times, and adherence to traffic rules, further contributes to the accuracy of the capacity model's estimations.

Transportation engineers can utilize various modeling tools and software, with the Highway Capacity Manual (HCM) being a widely-used resource, providing guidelines and procedures for capacity analysis. The HCM outlines many adjustment factors that modify the saturation flow rate of a lane including on-street parking.

In at least one embodiment, one or more dequeue zone sizes are calculated based upon a capacity model that considers the mode of operation at a signalized intersection. Common modes of operation at signalized intersections include fixed timing, independent actuated timing, and coordinated timing. With fixed timing at independent intersections, the dequeue zone sizes will remain constant over time because the time-duration data sets (phase timing data) remain fixed. With independent actuated operations, the intersection is actuated with a freely varying cycle length that accommodates changing levels of demand on each phase from one cycle to the next. In this case the time-duration datasets will change over time and can be aggregated over multiple cycles to show statistically representative views of the dequeue zone sizes.

With coordinated operations, there is planned time-offset synchronization of phase intervals between neighboring intersections that share a common or resonant cycle length. The purpose of the planned synchronization of offsets is to accommodate two-way progression of vehicle platoons without the need to stop at every intersection along a travel corridor. This implies that the time-duration allocated to each phase along the travel corridor has two purposes. The first purpose is to dequeue traffic waiting at the stop bar before the arrival of the platoon. The second purpose is to allow the platoon to progress with little or no interference. This means that at coordinated intersections, it is possible to calculate one or more dequeue zone sizes by partitioning the active green times into a dequeue portion and a platoon progression portion. This partitioning can be done by identifying green periods associated with dequeuing that are ahead of the platoon progression bands (green bands). The identification can be done using planning approaches that use a time-space diagram such as MAXBAND, or the identification can be done using methods similar to those used in the Enhanced Purdue Coordination Diagram (EPCD) as described by U.S. Pat. No. 9,412,271, which is incorporated by reference herein in its entirety.

Similarly, based on the traffic-demand dataset 154, the dequeue calculation module 170 calculates one or more queue sizes. These queue sizes represent the spatial areas related to the demand for traffic capacity. The calculation of queue sizes can be based on the level of inbound traffic for movement at the roadway intersection, as provided by the traffic-demand dataset 154. The level of inbound traffic may be originally gathered by traffic sensor(s) 130. For example, the level of inbound traffic may be measured based upon a stop bar sensor that detects objects crossing a stop bar.

In at least one embodiment, the traffic-demand dataset 154 comprises historical data based upon a historical average of the level of inbound traffic for movement at the roadway intersection. As such, the level of inbound traffic may comprise average data. For instance, the traffic-demand dataset 154 may store an average number for the level of inbound traffic for an active phase within an intersection, an average number for the level of inbound traffic for a given time period within the intersection, or some other cumulative average. As such, the dequeue calculation module 170 may provide one or more queue sizes that are based on average data. For instance, the dequeue calculation module 170 may provide one or more queue sizes that are based on an average for a particular time of day, such as an average for a high traffic period and an average for a low traffic period. In this case, the dequeue calculation module 170 may provide multiple different queue sizes for a particular lane depending upon the time of day requested by the computer system 100.

Additionally or alternatively, in at least one embodiment, the traffic-demand dataset 154 may comprise real-time queue data gathered by traffic sensor(s) 130 at the roadway intersection 200. For example, the traffic sensor(s) 130 may comprise radar sensors that are configured to provide real-time information about the number of vehicles waiting in a queue. In this embodiment, the computer system 100 may provide real-time, dynamic information to a user that allows the user to see the operations of the intersection in real-time. In at least one embodiment, a user is provided with an option to select between queue types based upon various different types of average queue sizes and real-time queue sizes. For instance, a user may select to see real-time queue data during a high traffic time and then later select to see average high traffic data for the same time period.

Once the computer system 100 has calculated the dequeue zone sizes and queue sizes, the rendering module 190 can provide a visual representation of the supply and demand of traffic capacity at the intersection. This allows for a clear and intuitive understanding of the traffic situation at the intersection, enabling traffic engineers and other users to make informed decisions to optimize traffic flow.

Figure 2:
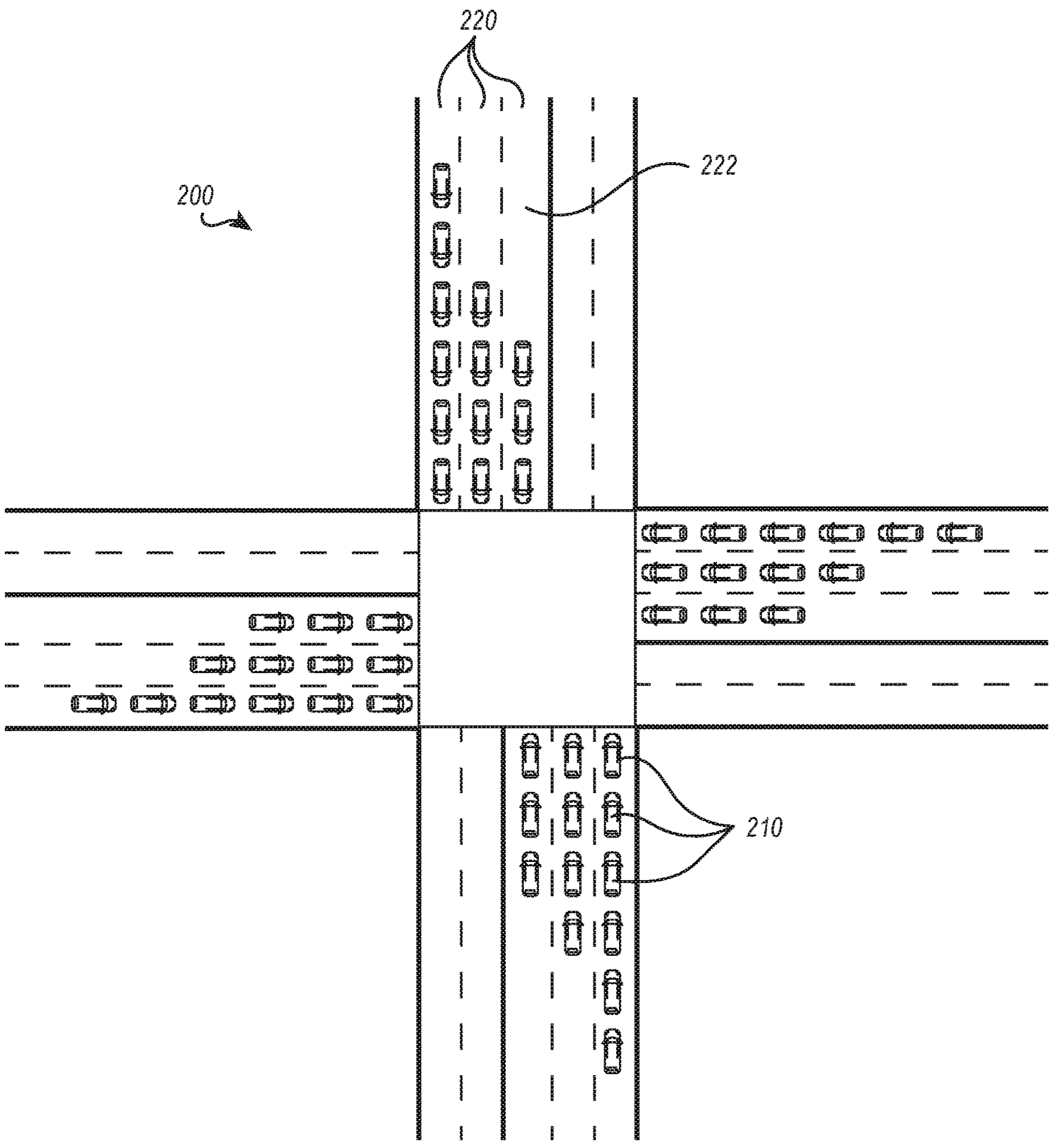
FIG. 2 illustrates a top view of an example intersection.

FIG. 2 depicts a top view of an example illustration of an intersection 200. The depicted intersection 200 is not limiting and is provided only for example and discussion. Disclosed embodiments may operate with a variety of different intersection configurations and types. The depicted intersection 200 includes various illustrations of vehicles 210 positioned on lanes 220 of the intersection. In this example, the lanes include turning lanes 222.

Figure 3:
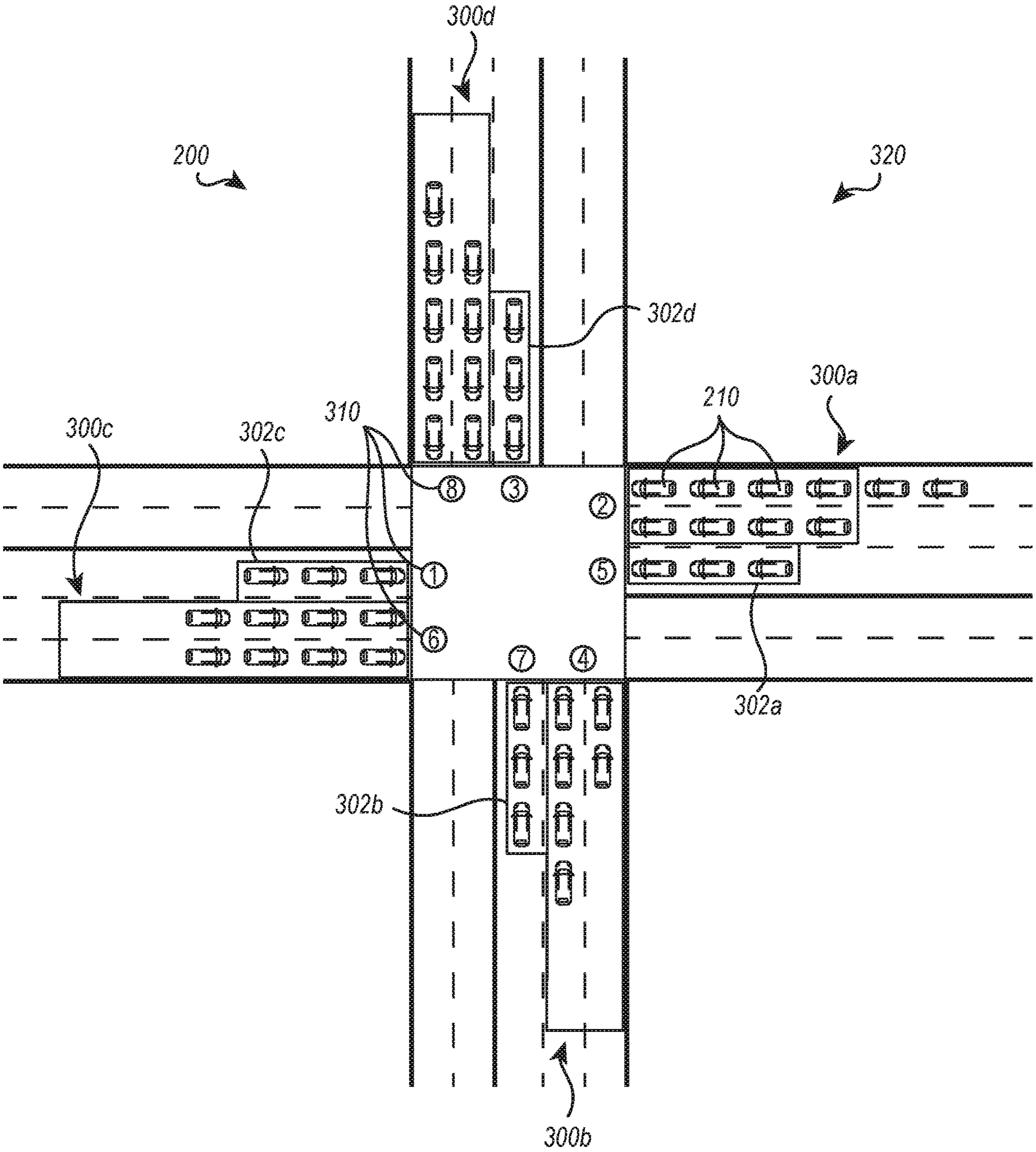
FIG. 3 illustrates a user interface for a traffic management system.

FIG. 3 illustrates a user interface 320 for a traffic management system. The user interface 320 displays a visual representation of the intersection 200 from FIG. 2. The user interface 320 includes a visual representation of dequeue zone sizes 300(*a-d*), 302(*a-d*) and queue sizes for one or more approaches that is displayed at a computer interface. In this depicted embodiment, the queue sizes are shown by visual representations of vehicles placed in the lanes of the intersection diagram 200. The vehicles 210 may represent an average queue size for the intersection 200, an average queue size for a particular time period for the intersection 200, or a real-time representation of the queue size for the intersection. This visual representation provides a spatial representation of the supply and demand of traffic capacity at the intersection. The dequeue zone sizes 300(*a-d*), 302(*a-d*), which represent the supply of traffic capacity, are calculated based on the duration of active time allocated to each traffic phase, as provided by the time-duration dataset 152. The queue sizes, which represent the demand for traffic capacity, are calculated based on the level of inbound traffic for movement at the roadway intersection, as provided by the traffic-demand dataset 154.

In at least one embodiment, the rendering of dequeue zone sizes 300(*a-d*), 302(*a-d*) and queue sizes (shown as vehicles 210) is visually overlaid on the visual representation of the one or more approaches. This overlay provides a clear and intuitive understanding of the traffic situation at the intersection 200. The dequeue zone sizes 300(*a-d*), 302(*a-d*) and queue sizes are represented as spatial areas on the visual representation of the intersection. The size and position of these areas correspond to the calculated dequeue zone sizes 300(*a-d*), 302(*a-d*) and queue sizes. The dequeue zone sizes 300(*a-d*), 302(*a-d*) are represented as areas that extend from near the stop line of each approach, with the length of each area corresponding to the calculated dequeue zone size 300(*a-d*), 302(*a-d*). The queue sizes are represented as vehicles 210 layered on top of the dequeue zone sizes 300(*a-d*), 302(*a-d*). One will appreciate, however, that the depicted shading and use of visual representation of vehicles 210 is merely exemplary and is not limiting to the present invention. For example, in at least one embodiment, the dequeue zone sizes 300(*a-d*), 302(*a-d*) and queue sizes can both be rendered as different colors of shading. As a second example, the dequeue zones sizes 300(*a-d*), 302(*a-d*) can be rendered with a transparent interior and with only the back edge of the border showing for each lane or movement. This second example provides less visual clutter and simply marks the dequeue zone sizes 300(*a-d*), 302(*a-d*) based upon their setback from the stop bar with some type of line or other visual marker. As such, a wide variety of different visual representations may be used that depict a spatial representation of a dequeue zone size 300(*a-d*), 302(*a-d*) and a spatial representation of a queue size.

In the depicted embodiment, the dequeue zone sizes 300(*a-d*), 302(*a-d*) and queue sizes visually overlap on the visual representation of the intersection 200. This visual overlap allows a user to easily identify situations where the demand for traffic capacity exceeds the supply of traffic capacity. In some embodiments, the rendering module 190 may provide visual cues, such as color coding or shading, to indicate the extent of the overlap and the severity of the traffic congestion. This allows traffic engineers and other users to quickly identify potential issues and make informed decisions to optimize traffic flow.

In at least one embodiment, the dequeue zone sizes 300(*a-d*), 302(*a-d*) and queue sizes do not visually overlap on the visual representation of the intersection 200. For example, the dequeue zone sizes 300(*a-d*), 302(*a-d*) and queue sizes may be rendered adjacent to each other. As another example, the dequeue zone sizes 300(*a-d*), 302(*a-d*) and queue sizes may be rendered in separate charts that show all of the dequeue zone sizes 300(*a-d*), 302(*a-d*) together and separately show the queue sizes together. Accordingly, a wide variety of different means may be used to display the relationships between a spatial representation of a dequeue zone size 300(*a-d*) and a spatial representation of a queue size.

The visual representation of dequeue zone sizes 300(*a-d*), 302(*a-d*) and queue sizes for one or more approaches can be displayed on a variety of computer interfaces, including desktop computers, laptops, tablets, and mobile devices. The computer system 100 may provide interactive features that allow users to zoom in and out, pan, rotate, and otherwise manipulate the visual representation to view the intersection from different perspectives. The computer system 100 may also provide tools for measuring distances, calculating areas, and performing other spatial analyses on the visual representation.

Additionally, in some embodiments visual indicators 310 may be used to indicate lanes that are determined to have insufficient dequeue zone sizes, excess dequeue zone sizes, or various other issues. Further, the visual indicators 310 may be used to label the lanes, movements, or phases in order of magnitude of traffic. This information may be useful to a traffic engineer when adjusting signal times at the intersection 200.

Figure 4:
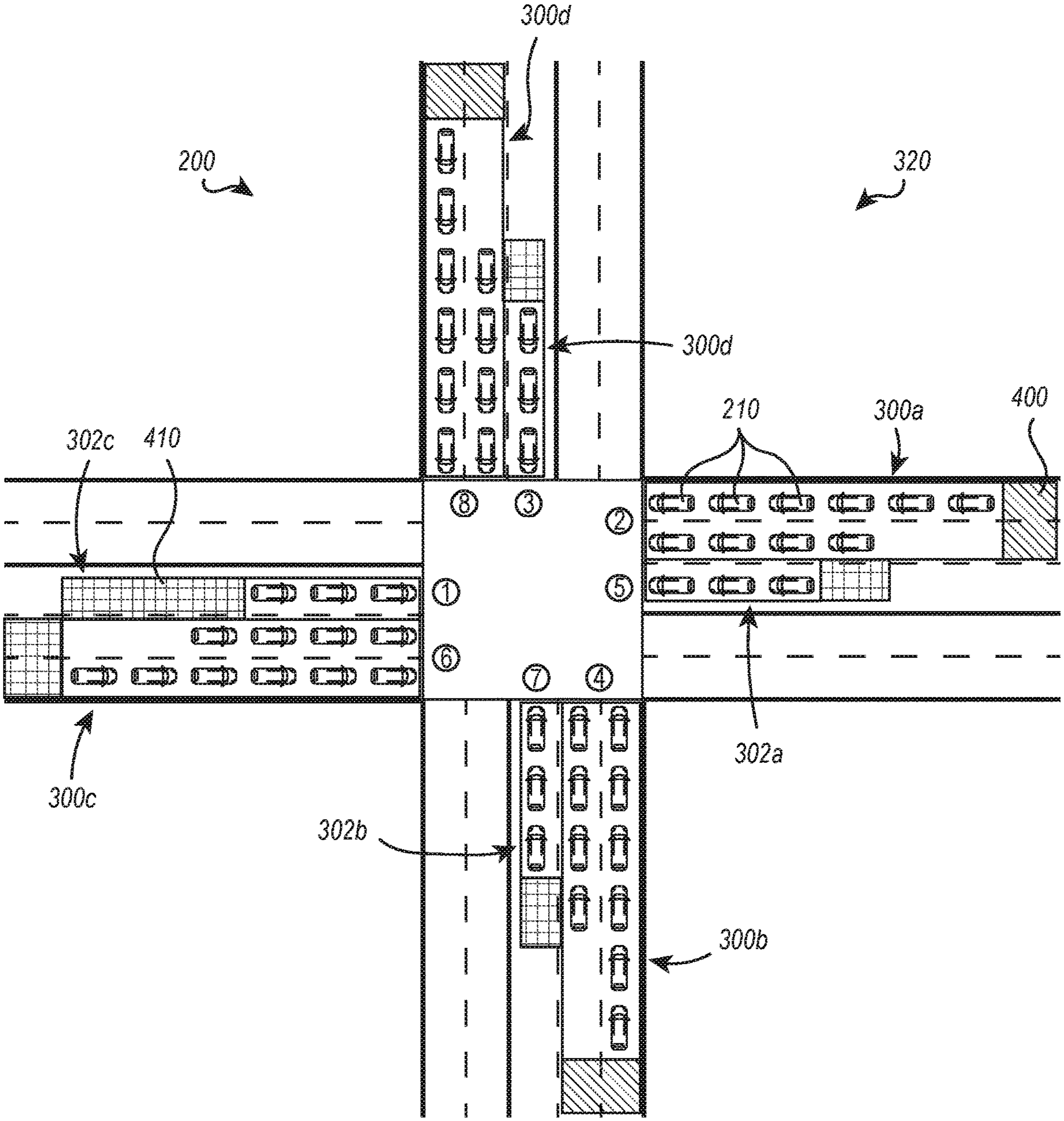
FIG. 4 illustrates a user interface for a traffic management system.

FIG. 4 illustrates a user interface 320 for a traffic management system after an adjustment to a dequeue zone size 300(*a-d*), 302(*a-d*) has been received. The computer system 100 is configured to receive an input to adjust a size of a particular dequeue zone size. This input can be received through a computer interface, such as a graphical user interface displayed on a computer monitor, a touchscreen of a mobile device, or any other type of user interface that allows a user to interact with the system. The input can be provided by a user, such as a traffic engineer or other user, who wishes to adjust the size of a particular dequeue zone size based on their knowledge and understanding of the traffic situation at the intersection.

In at least one embodiment, the input is received by a user selecting a particular dequeue zone size (e.g., 300*a*) that the user wishes to adjust. The user may then drag, with a computer mouse, the dequeue zone size 300*a* to either enlarge or shrink the dequeue zone size 300*a*. For example, in FIG. 4, dequeue zone size 300*a* has been shrunk as indicated by the shaded area 400. In at least one embodiment, the rendering module 190 will render a shrunk portion of a dequeue zone size 300*a* in a different color or a different way to visualize to the user the changes that have been made to the dequeue zone size 300*a*. Additionally, in FIG. 4, dequeue zone size 302*c* has been enlarged as indicated by the shaded area 410. Similarly to when a dequeue zone size 300*a* is shrunk, the rendering module 190 may render an enlarged portion of a dequeue zone size 302*c* in a different color or some other different way to visualize to the user the changes that have been made to the dequeue zone size 302*c*. In at least one embodiment, each dequeue zone size 300(*a-d*), 302(*a-d*) can be independently adjusted. Additionally, due to differences in light signals, dequeue zone sizes 300(*a-d*) for straightway lanes may be handled separately from dequeue zone sizes 302(*a-d*) for turn lanes.

Upon receiving an input to adjust a size of a particular dequeue zone size 300(*a-d*), 302(*a-d*), the dequeue adjustment module 180 may calculate an adjusted duration of active time allocated to the particular dequeue zone size with the adjusted size. The calculation of the adjusted duration of active time can be based on the adjusted size of the dequeue zone size. For example, the adjusted duration of active time may be calculated by creating a ratio of the adjusted size of the dequeue zone size with the previous dequeue zone size and then multiplying this ratio by the previous active time allocated to the signal(s) at issue.

In at least one embodiment, the computer system 100 can communicate the adjusted duration of active time to a traffic controller 120 that is configured to control the roadway intersection. The communication can be performed using any suitable communication protocol, such as a wired or wireless communication protocol. The traffic controller 120 receives the adjusted duration of active time and adjusts the duration of active time allocated to the particular traffic phase accordingly. This allows the traffic controller to control the traffic at the intersection 200 based on the adjusted dequeue zone size and the adjusted duration of active time, thereby optimizing the traffic flow at the intersection. The adjusted duration of active time can be communicated by directly updating the set of planned timing values stored in the traffic controller 120, or by registering and unregistering demand for selected phases using actuations sent over the detector inputs of the traffic controller 120. The adjusted duration of active time can also be communicated using hold and force off commands sent to the controller.

In at least one embodiment, the computer system 100 comprises internal algorithms, both conventional and novel, for analyzing traffic flow. These algorithms may provide additional visual information to a user regarding suggested changes, potential problems with a proposed adjusted dequeue zone size, or other analysis of an intersection. This allows the user to visually confirm the effect of the adjustment on the supply and demand of traffic capacity at the intersection 200.

Figure 5:
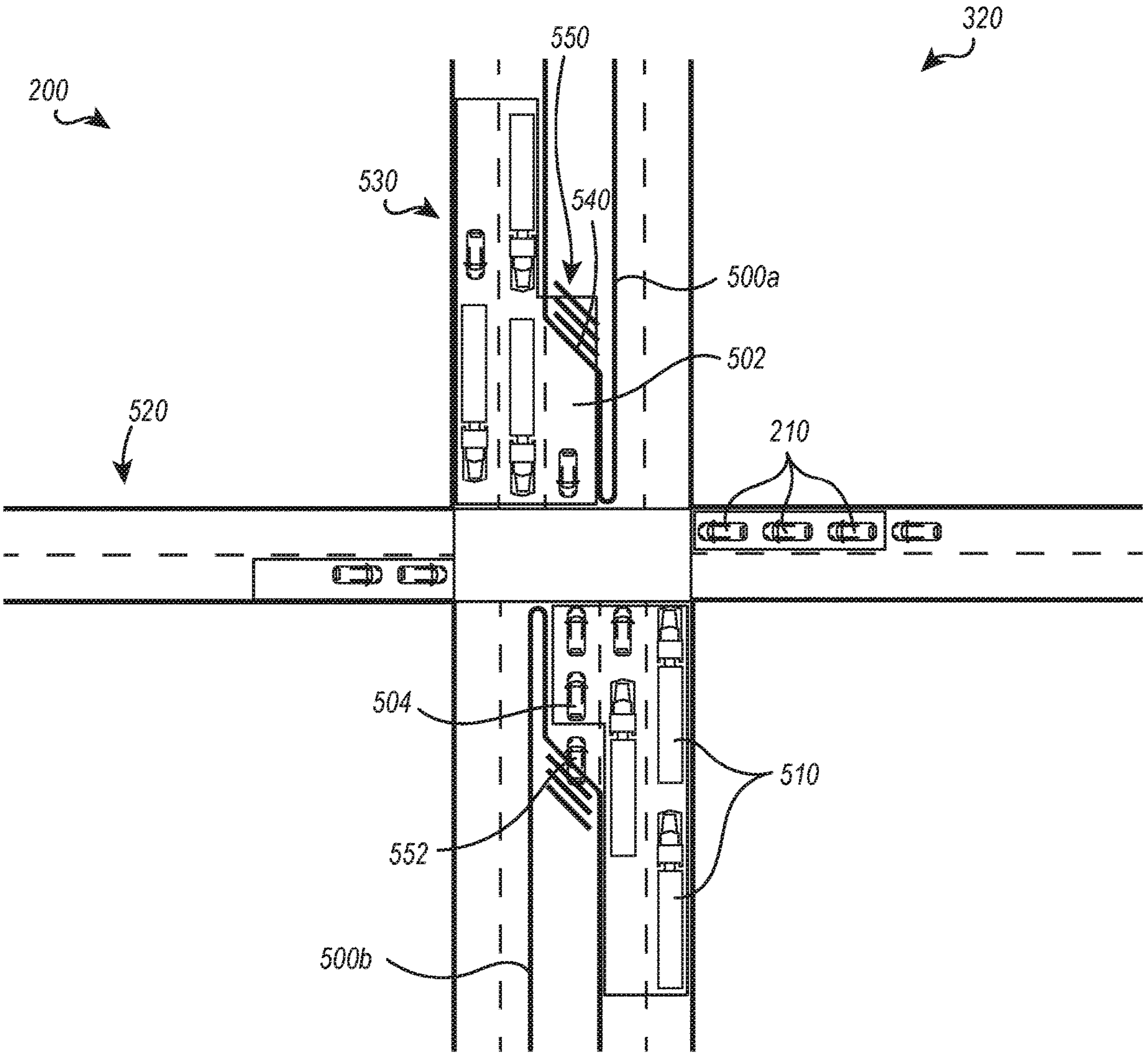
FIG. 5 illustrates a user interface for a traffic management system.

FIG. 5 illustrates a user interface 320 for a traffic management system. In at least one embodiment, the visual representation of one or more legs of the roadway intersection 200 comprises a photograph of the roadway intersection. In this depicted embodiment, the intersection 200 comprises a two-lane road 530 intersecting with a single lane road 520. Additionally, the two-lane road 530 comprises two dedicated turning lanes 502, 504 coming from the top and bottom directions.

In contrast to the previously depicted user interfaces, this depicted intersection 200 comprises multiple different types of vehicles 210. In particular, this intersection 200 is depicted as including semi-trucks 510. In at least one embodiment, the computer system 100 displays real-time images or uses real-time data to depict the presence of various types of vehicles at the intersection. For example, a radar sensor may have real-time data that estimates the length of each vehicle. Or a video sensor may have a method of automatically classifying vehicles. The types of vehicles may include, but are not limited to, cars, trucks, semi-trucks, buses, motorcycles, bicycles, and any number of other vehicles. In at least one embodiment, the vehicle types are displayed based upon average data. For example, the computer-readable media 150 may store information about the mixture of vehicles seen at the intersection 200 for a given period of time. For instance, traffic sensors(s) 130 or visual surveys may be used to determine that an average number of semi-trucks, an average number of passenger vehicles, and an average number of motorcycles pass through the intersection 200 during a rush period. This information can be used by the rendering module 190 to render visual approximations of the average mixture of different vehicle types through the intersection 200 for a given period of time. This information may be visually useful to a user to understand the actual vehicle sizes that fit within a given dequeue zone size.

Additionally, as shown in FIG. 5, the turning lanes 502, 504 are physically enclosed by cut-outs from respective islands. As such, the total possible length of the turning lanes 502, 504 are physically constrained by the islands. In at least one embodiment, the computer system 100 may render a visual indication 550 on an area whether the dequeue zone size is larger than the physical turn lane 502. This visual indication 550 may provide helpful information to a user regarding the relationship between the signal times and the physical constraints of an intersection. For example, if the dequeue zone size is larger than the physical turn lane 502 vehicles 210 may have additional time to enter the turn lane, travel down the turn lane, and pass through the intersection during a single active signal phase. However, some traffic engineers may determine that having a dequeue zone size larger than the physical turn lane 502 is inefficient and desire to allocate the additional time to the phase of another movement.

Similar to the above, in at least one embodiment, the computer system 100 may render a visual indication 552 on an area whether the queue size is larger than the physical turn lane 504. This visual indication 552 may provide helpful information to a user regarding the relationship between the signal times and the physical constraints of an intersection. Additionally, this information may be useful to traffic planners when the intersection is being redesigned. For instance, a traffic planner may determine that the turning lane 504 should be extended to provide additional storage capacity or that an additional turn lane should be added to the intersection.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
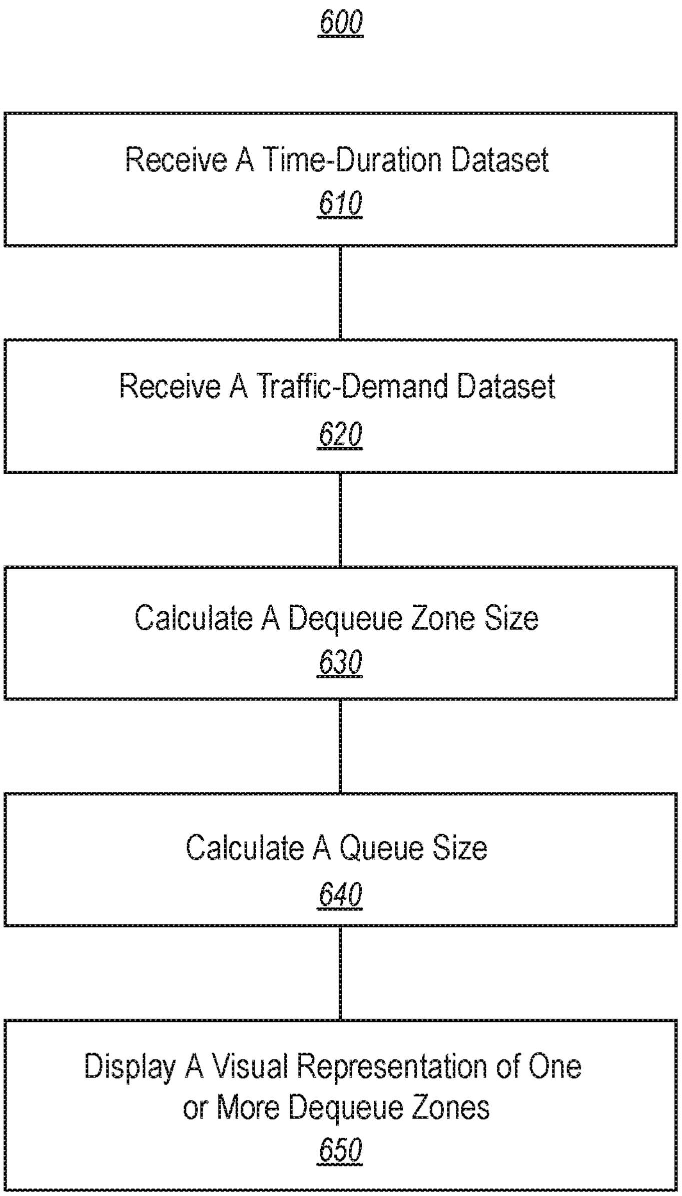
FIG. 6 illustrates a flowchart of a method for a traffic management system.

Referring now to FIG. 6, a method 600 for displaying a supply of traffic capacity and a level of traffic demand at a roadway intersection is illustrated. Method 600 may optionally include an act 610 of receiving a time-duration dataset. Act 610 comprises receiving a time-duration dataset comprising a duration of active time allocated to each of one or more traffic phases assigned to movements at the roadway intersection 200. For example, as depicted in FIG. 1, the traffic management system 140 can access a time-duration dataset 152 from a computer-readable media 150.

Additionally, method 600 may optionally include an act 620 of receiving a traffic-demand dataset. Act 620 comprises receiving a traffic-demand dataset 154 comprising the level of inbound traffic for movement at the roadway intersection 200. For example, as depicted in FIG. 1, the traffic management system 140 can access a traffic-demand dataset 154 from a computer-readable media 150.

Method 600 also includes an act 630 of calculating a dequeue zone size. Act 630 comprises calculating one or more dequeue zone sizes based on phase time duration data for the roadway intersection. For example, as depicted and described with respect to FIGS. 1 and 3, the dequeue calculation module can calculate a dequeue zone size 300(*a-d*), 302(*a-d*) using the time-duration dataset 152.

Method 600 further includes an act 640 of calculating a queue size. Act 640 comprises calculating one or more queue sizes based on traffic demand data for the roadway intersection. For example, as depicted and described with respect to FIGS. 1 and 3, the dequeue calculation module can calculate a queue size (shown by vehicles 210) using the traffic-demand dataset 154.

Further still, method 600 includes an act 650 of displaying a visual representation of one or more dequeue zones. Act 650 comprises displaying, at a computer interface, a visual representation of the one or more dequeue zone sizes 300(*a-d*), 302(*a-d*) for one or more approaches to the roadway intersection. The visual representation may also optionally depict a rendering of the one or more queue lengths for one or more approaches of the roadway intersection. For example, FIGS. 3-5 and their associated descriptions show a user interface that comprises an intersection 200 with included dequeue zone sizes 300(*a-d*), 302(*a-d*) and queue sizes (shown by vehicles 210) visually overlaid on each other.

Accordingly, disclosed embodiments include novel methods for visualizing traffic data. The disclosed embodiments provide easy to understand information relating to signal timing and queue lengths. For example, disclosed embodiments display a spatial representation of dequeue zone sizes with respect to spatial representations of queue sizes. This information provides a user, such as a traffic engineer, with an increased understanding of intersection dynamics. Additionally, disclosed embodiments may allow a traffic engineer to make adjustments to signal times within the user interface.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for displaying a supply of traffic capacity at a roadway intersection, comprising:

one or more processors; and one or more computer-readable media having stored thereon executable instructions that when executed by the one or more processors configure the computer system to:

calculate one or more dequeue zone sizes based on phase time duration data for the roadway intersection, wherein the one or more dequeue zone sizes comprise a predicted or estimated length of roadway or a predicted or estimated number of vehicles that can dequeue during a single active signal phase;

display, at a computer interface, a visual representation of the one or more dequeue zone sizes for one or more approaches of the roadway intersection, wherein the visual representation of the one or more dequeue zone sizes comprises a spatial representation;

receive an input configured to adjust a particular dequeue zone size;

calculate, based on the input, an adjusted duration of active time allocated to the adjusted particular dequeue zone size; and communicate the adjusted duration of active time to a traffic controller that is configured to control the roadway intersection.

2. The computer system of claim 1, wherein the executable instructions that are executable to configure the computer system to calculate the one or more dequeue zone sizes further comprise executable instructions to calculate the one or more dequeue zone sizes based upon a capacity model.

3. The computer system of claim 1, wherein the executable instructions configure the computer system to also calculate one or more queue sizes based on traffic demand data for the roadway intersection.

4. The computer system of claim 3, wherein the traffic demand data for the roadway intersection comprises historical data based upon a historical average amount of inbound traffic at the roadway intersection.

5. The computer system of claim 4, wherein the historical average amount of inbound traffic is measured based upon objects stopping in one or more queue positions upstream of a stop bar on red.

6. The computer system of claim 4, wherein the historical average amount of inbound traffic is measured based upon a stop bar sensor that detects objects crossing a stop bar.

7. The computer system of claim 3, wherein the traffic demand data for the roadway intersection comprises real-time data received from a traffic sensor system at the roadway intersection.

8. The computer system of claim 1, wherein the visual representation of one or more legs of the roadway intersection comprises a photograph of the roadway intersection.

9. The computer system of claim 1, wherein displaying the visual representation of the one or more dequeue zone sizes for the one or more approaches of the roadway intersection comprises rendering of the one or more dequeue zone sizes on a per-lane basis overlaid on the visual representation of one or more legs of the roadway intersection.

10. The computer system of claim 3, wherein the visual representation also depicts a rendering of one or more queue sizes for one or more approaches of the roadway intersection.

11. The computer system of claim 10, wherein the rendering of the one or more queue sizes for one or more approaches of the roadway intersection comprises rendering the one or more queue sizes on a per-lane basis overlaid on the visual representation of one or more legs of the roadway intersection.

12. The computer system of claim 3, wherein at least a portion of the one or more queue sizes and the one or more dequeue zone sizes visually overlap.

13. The computer system of claim 1, wherein the input is received through the computer interface, and wherein the particular dequeue zone size is displayed with an adjusted size corresponding to the input.

14. The computer system of claim 1, wherein the executable instructions include instructions that are executable to configure the computer system to:

render in real-time a dequeue zone size live residual based upon remaining active time for active phases.

15. A computer-implemented method for displaying a supply of traffic capacity at a roadway intersection, comprising:

calculating one or more dequeue zone sizes based on phase time duration data for the roadway intersection, wherein the one or more dequeue zone sizes comprise a predicted or estimated length of roadway or a predicted or estimated number of vehicles that can dequeue during a single active signal phase;

displaying, at a computer interface, a visual representation of the one or more dequeue zone sizes for one or more approaches of the roadway intersection, wherein the visual representation of the one or more dequeue zone sizes comprises a spatial representation;

receiving an input configured to adjust a particular dequeue zone size;

calculating, based on the input, an adjusted duration of active time allocated to the adjusted particular dequeue zone size; and communicating the adjusted duration of active time to a traffic controller that is configured to control the roadway intersection.

16. The computer-implemented method of claim 15, wherein calculating the one or more dequeue zone sizes further comprises calculating the one or more dequeue zone sizes based upon a capacity model.

17. The computer-implemented method of claim 15, further comprising calculating one or more queue sizes based on traffic demand data for the roadway intersection.

18. The computer-implemented method of claim 17, wherein the traffic demand data for the roadway intersection comprises historical data based upon a historical average amount of inbound traffic at the roadway intersection.

19. The computer-implemented method of claim 18, wherein the historical average amount of inbound traffic is measured based upon a stop bar sensor that detects objects crossing a stop bar.

20. The computer-implemented method of claim 18, wherein the historical average amount of inbound traffic is measured based upon objects stopping in one or more queue positions upstream of a stop bar on red.

21. The computer-implemented method of claim 17, wherein the traffic demand data for the roadway intersection comprises real-time data received from a traffic sensor system at the roadway intersection.

22. The computer-implemented method of claim 17, wherein the visual representation also depicts a rendering of the one or more queue sizes for one or more approaches of the roadway intersection.

23. The computer-implemented method of claim 22, wherein displaying the visual representation of the one or more dequeue zone sizes for the one or more approaches of the roadway intersection comprises rendering the one or more dequeue zone sizes on a per-lane basis overlaid on the visual representation of one or more legs of the roadway intersection.

24. The computer-implemented method of claim 23, wherein the rendering of the one or more queue sizes for one or more approaches of the roadway intersection comprises the one or more queue sizes on a per-lane basis overlaid on the visual representation of one or more legs of the roadway intersection.

25. The computer-implemented method of claim 22, wherein at least a portion of the one or more queue sizes and the one or more dequeue zone sizes visually overlap.

26. The computer-implemented method of claim 15, wherein the visual representation of one or more legs of the roadway intersection comprises a photograph of the roadway intersection.

27. The computer-implemented method of claim 15, wherein the input is received through a sensor, and wherein the particular dequeue zone size is displayed with an adjusted size corresponding to the input.

28. The computer-implemented method of claim 15, further comprising:

rendering in real-time a dequeue zone size live residual based upon remaining active time for active phases.

* * * * *